(12) United States Patent  (10) Patent No.: US 8,311,342 B2
Schopp et al.  (45) Date of Patent: Nov. 13, 2012

(54) CLASSIFICATION OF OBJECTS AS WELL AS RECOGNITION OF THEIR POSITION AND ORIENTATION IN SPACE

(75) Inventors: Thomas Schopp, Freiberg (DE); Alexander Tomm, Emmendingen (DE); Frank Erb, Denzlingen (DE)

(73) Assignee: Sick AG, Waldkirch (DE)

( * ) Notice: Subject to any disclaimer, the term of this patent is extended or adjusted under 35 U.S.C. 154(b) by 1057 days.

(21) Appl. No.: 12/289,215

(22) Filed: Oct. 22, 2008

(65) Prior Publication Data

US 2009/0110301 A1 Apr. 30, 2009

(30) Foreign Application Priority Data

Oct. 26, 2007 (EP) ..................................... 07119373

(51) Int. Cl.
*G06K 9/62* (2006.01)
(52) U.S. Cl. ......................................................... 382/224
(58) Field of Classification Search .................. 382/224, 382/192, 182, 141; 235/454, 559
See application file for complete search history.

(56) References Cited

U.S. PATENT DOCUMENTS

| 4,788,569 | A | * | 11/1988 | Yamada et al. | 396/147 |
| 5,774,357 | A | * | 6/1998 | Hoffberg et al. | 713/600 |
| 6,164,540 | A | * | 12/2000 | Bridgelall et al. | 235/462.01 |
| 6,541,754 | B2 | * | 4/2003 | Matsuyama | 250/214.1 |
| 7,450,735 | B1 | * | 11/2008 | Shah et al. | 382/103 |
| 2007/0127811 | A1 | * | 6/2007 | Luo | 382/159 |

FOREIGN PATENT DOCUMENTS

EP 1 380 986 B1 7/2008

OTHER PUBLICATIONS

Campbell, Richard J., et al., "A Survey of Free-Form Object Representation and Recognition Techniques," BNS, p. 1-48, (2001).
Viola, Paul, et al., "Rapid Objection Detection using a Boosted Cascade of Simple Features," BNS, 2001, p. I-511-I-518, IEEE.
Greenspan, Michael, "The Sample Tree: A Sequential Hypothesis Testing Approach to 3D Object Recognition," BNS, 1998, p. 772-779, IEEE.
Office Action issued on May 27, 2011, for corresponding European Application No. 07 119 373.4, twelve (12) pages.

(Continued)

*Primary Examiner* — Alex Liew
*Assistant Examiner* — Aklilu Woldemariam
(74) *Attorney, Agent, or Firm* — Nath, Goldberg & Meyer; Jerald L. Meyer; Robert T. Burns (57) ABSTRACT

A method for the classification of objects (16) and/or the recognition of their position and/or their orientation in space is set forth, wherein measurement object data points of a measurement object surface are generated using a distance resolving receiver unit (18) and, with the aid of model object data determined in advance, hypotheses on the class, the position and/or the orientation of a measurement object (16) are proposed and verified from the measurement object data points. A plurality of different hypothesis tests can be executed cascaded in such a way that only on verification of a hypothesis through a hypothesis test is a subsequent hypothesis test carried out within this cascade, until either a hypothesis is falsified by the failure of a hypothesis test or a hypothesis is verified as a whole through a complete run through a cascade without falsification.

20 Claims, 7 Drawing Sheets

OTHER PUBLICATIONS

XP-000897104: Chen, C.S., et al., "RANSAC-Based DARCES: A New Approach to Fast Automatic Registration of Partially Overlapping Range Images", *IEEE Transactions on Pattern Analysis and Machine Intelligence, IEE Service Center*, Los Alamitos, CA US, vol. 21, No. 11, pp. 1229-1234, (Nov. 1999).

XP019027451: Pong, Hon-Keat, et al., "Object Detection Using a Cascade of 3D Models", *Computer Vision—ACCV 2006 Lecture Notes in Computer Science, LNCS, Springer-Verlag*, BE, pp. 284-293, (2005).

XP 022069312: Chen, H., et al.,"3D free-form object recognition in range images using local surface patches", *Pattern Recognition Letters, Elsevier*, Amsterdam, NL, vol. 28, No. 10, pp. 1252-1262, (Jul. 2007).

XP019005872: Andrea, F., et al.,"Recognizing Object in Range Data Using Regional Point Descriptions", *Computer Vision—ECCV 2004 Lecture Notes in Computer Science, LNCS, Springer-Verlag*, BE, pp. 224-237, (2004).

XP000554284: Chua, C.S. et al., "3D Free-Form Surface Registration and Object Recognition", *International Journal of Computer Vision Kluwer Academic Publishers*, Norwell, US, vol. 17,No. 1,, pp. 77-99, (Jan. 1966).

XP-001159740: Chen, C.S., et al.,"A Fast Automatic Method for Registration of Partially-Overlapping Range Images", *Proceedings on the International Conference on Computer Vision*, pp. 242-248, (Jan. 4, 1998).

XP007903009: Lepetit, V., et al.,"Monocular Model-Based 3D Tracking of Rigid Objects: A Survey", *Foundations and Trends in Computer Graphics and Vision, Now Publishers Inc.*, Hanover, MA,US, vol. 1, No. 1, pp. 1-89, (2005).

XP004216271: Paquet, E., et al., "Description of shape information for 2-D and 3-D objects", *Signal Processing Imaging Communication, Elsevier Science Publishers*, Amsterdam, NL, vol. 16, No. 1-2, pp. 103-122, (2000).

* cited by examiner

CLASSIFICATION OF OBJECTS AS WELL AS RECOGNITION OF THEIR POSITION AND ORIENTATION IN SPACE

The present subject matter relates to the classification of objects and/or the detection of their position and/or their orientation.

The automated classification of real three-dimensional objects makes major challenges on a sensor system and the subsequent processing. An important area of application is storage technology and conveying technology, for example in the automotive industry or in other areas. In this process the form and position of objects has to be recognized so that all arising tasks can be transferred to autonomous robot systems. If not only the fixedly preset trajectories should be covered, then the systems have to possess the ability to adaptively match their procedures to their surroundings. Specifically, this could be the depalletization of components or their assembly, where the gripping control of the robot requires the exact position of the object to choose the matching gripping tool and to position it.

Today's assembly robots still usually grip the components to be assembled/installed from mechanical apparatuses which were specifically designed for this application and which explicitly determine the position as well as the class of the component. Thus, the necessity of classification is dispensed with, the system is, however, correspondingly inflexible and actually one would like to be able to grip the components directly from a transport box or from a conveyor belt.

For the most part, the sensors of conventional systems still use algorithms for the determination of the class and the position of the object, in which the object is only modeled in two dimensions. However, on the reduction from three to two dimensions, too much information can be lost so that the classification of objects can no longer be clearly determined. Applications can therefore usually only be solved in a task-related manner and are not migrateable. Generally, the position and orientation of the objects in space is not allowed to be arbitrary to prevent classification mistakes.

It is therefore desired to detect objects three-dimensionally and to determine their position in three degrees of freedom and their orientation in space in three degrees of freedom. In the following these six degrees of freedom are frequently referred to as the six-dimensional position or the 6D position of the object.

In the prior art several approaches are known to generate hypotheses on the class of the objects and their 6D position from three-dimensional scatter plots or other representations of the object surface and to subsequently verify these with a test strategy. However, one is faced with the choice of either obtaining a fast strategy at the cost of a high rate of failure or of using a calculation intensive and exact verification strategy, whose runtime is, however, too long in practice measured with, for instance, respect to the conveying speed of the objects in front of a robot.

For the use in such three dimensional methods, among other things, 3D descriptors are known which are based on distributions of object properties in the form of histograms. These include, for instance, spin images, 3D shape contexts, geometric hashing or COSMOS. For further information, in particular spin images, reference is additionally made to the publication of Andrew E. Johnson "Spin-Images: A Representation for 3D-Surface Matching", dissertation, Carnegie Mellon University, Pittsburgh, Pa., USA. The results are not accurate enough, at least within an acceptable runtime, for applications in the robot-supported automation technology.

A known algorithm for the verification of hypotheses is the RANSAC algorithm by Fischler et al from "Random sample consensus: a paradigm for model fitting with applications to image analyses and automated cartography", Communications of the ACM, Vol. 24/6, June 1981, ACM Press 1981. In this a random selection of data points is chosen to generate a hypothesis, preferably the smallest possible selection, which allows a statement, and this is repeated for so long by iteration until a hypothesis can be verified. A direct application for three dimensional scanning of an object and its classification and 6D position determination is, however, not set forth there.

In the work of Shan et al "Linear Model Hashing and Batch RANSAC for Rapid and Accurate Object Recognition", Proceedings of the 2004 IEEE Computer Society Conference on Computer Vision and Pattern Recognition (CVPR'04), IEEE, 2004, such a RANSAC algorithm and a Bayes classifier are used for an object recognition and its 6D position determination. This algorithm is also too slow for practical application.

Finally, it is known to move and to turn the position of an object, for instance in the representation as a polygon mesh of the surface, with respect to a corresponding model object until the distances of the real object points from the model points are minimized. For this, for example, basically long known least mean square methods can be used. In this respect, the 6D position is not only tested as a hypothesis, but the hypothesis is thereby optimized (ICP method, iterative closest point). A disadvantage of the ICP method is the comparatively slow evaluation which cannot test a large number of hypotheses within an acceptable runtime. Furthermore, the ICP method tends to converge in local extrema and it is not in a position to distinguish this from the desired global extrema. The result in such a case is a faulty classification and 6D position determination.

It is therefore the object of the invention to provide a classification and 6D position determination for objects which is both fast and works accurately enough.

This object is satisfied by a method for the classification of objects in accordance with. Through the cascading of hypothesis tests, different methods can be combined in a resource saving manner complementing one another in their accuracy and reduce the runtime significantly at the same time. It can thus be ensured that expensive, runtime intensive hypothesis tests are only applied to really plausible good candidates, while poor hypotheses can be excluded by short, comparatively simple hypothesis tests The further advantage is associated with the invention of a simple and universal integration possibility in complex systems with common reference coordinates and of the possibility to model, to differentiate and to recognize complex objects in a very short time. In doing so, runtimes are achieved which are by up to a factor 10 better than with conventional methods so that, on installation on a conveyor belt, a classification and 6D position determination is present, within a few millimeters of the conveyed distance without losing any accuracy of the classification through this. Through this improvement of the initially described three-dimensional classifiers they are brought into practical feasibility from theory.

In this respect, the cascade is advantageously processed starting from the hypothesis test with the shortest runtime up to the hypothesis test with the longest runtime. Typically, the fastest hypothesis test is at the same time also the most inaccurate hypothesis test and the slowest hypothesis test is also the best. With this kind of cascaded arrangement the speed advantage obtained, in accordance with the invention, is also further optimized.

The model object data preferably have model histograms, which, respectively starting from a point of the model surface, describes a distribution of the position or of a property of neighboring model surface points, in particular spin images, 3D shape contexts or remission images are used as model histograms and/or wherein corresponding measurement histograms are generated from at least some of the measurement object data points. These descriptors allow a particularly exact and fast classification. When choosing a suitable object descriptor, a series of requirements namely has to be respected: The descriptor should be suitable for an incomplete object representation and for the 6D position determination, translation invariant and rotationally invariant and should be able to process complex objects, in particular in an object representation as a scatter plot, in an acceptable implementation time, with an acceptable runtime and with an acceptable memory demand. Here, particularly the histogram-based approaches in accordance with the invention form a good solution and from them the named specific histograms are in turn particularly suitable.

The model object data are preferentially taught and/or are calculated from a CAD file and are archived in a model library, and/or model histograms, which are the same or very similar due to symmetries, are only stored once in the model library and only a the reference to the associated model histogram is stored, in each case, by means of referencing or hashing to the model surface points, but not the respective model histogram and/or the model histograms are compressed for data reduction. With a suitable teaching method, practically any desired objects can be classified. On the other hand, it is conceivable to make use of present CAD data so that in total complete flexibility is present. When the same or similar histograms are only stored once, a large proportion of the required memory resources can be saved. This can also be achieved or further improved in that the histograms are per se saved using a compressing method.

In an advantageous embodiment, correspondences, in particular point or polygon correspondences, are determined between model surface points and measurement points in that the similarity between model histograms and measurement histograms is evaluated, in particular through a distance norm or a correlation, with a small proportion of correspondences with the best similarity of evaluation being used for the hypothesis tests, in particular a proportion of at most one percent of a distribution of the similarity evaluation of all possible comparisons between model histograms and the measurement histograms. The correspondences determined in this manner constitute a reservoir histograms which have a good or very good match which, when they form the basis of histogram formation, can lead to the most promising hypotheses. The method in accordance with the invention thus uses less time for the test of anyway not particularly promising hypotheses and can thereby be used with a further reduced runtime.

The cascade of the hypothesis tests is preferably run through a plurality of times based on a RANSAC algorithm until either a hypothesis is verified to the required accuracy, a highest runtime has passed or an upper limit of a number of hypotheses to be tested is exceeded, with a hypothesis for the object class, position and orientation of the measurement object being proposed for each run through the cascade, in that a subset of point correspondences, in particular three point correspondences, is randomly determined under the requirement that all point correspondences of the subset belong to the same object class and that a position and orientation of the measurement object are derived from the position and/or the orientation associated with the point correspondences of the subject. The RANSAC algorithm based on a random sample is particularly suitable for a classification without knowledge of the model. Since in each case a minimum number of point correspondences is selected, which allows the verification or the falsification of the hypothesis, the runtimes are kept exceptionally small. A RANSAC algorithm also functions, however, like the total method in accordance with the invention, when the hypotheses are restricted by the knowledge of the model.

The hypothesis tests preferably include one or more of the following methods: a bounding-box test, in which a selection of measurement object data points is tested to see whether they lie within an envelope body of the model object, a range-image test, a position and orientation optimization, in particular an iterative least-mean-square method in which the measurement object data points are brought into an optimum match with a surface grid of a model object, or a nearest-neighbor test which is in particular the 0th iteration of the position optimization based on a selection of the measurement object data points. It is particularly advantageous when all of these methods are provided, with differing from the indicated sequence the nearest-neighbor test being disposed before the position and orientation optimization. The initial bounding box test is very fast and is suited to eliminate incorrect hypotheses rapidly. It would be less suited to verify a hypothesis to sufficient accuracy. With a range-image test, in which distance images are compared to one another, results can also be obtained very quickly. Precise statements on the orientation of the objects in space can, however, particularly still be inaccurate. With a nearest neighbor test, it can quickly be determined how well the model and the measurement object already coincide. Only when all of these comparatively non-complex and/or inexpensive hypothesis tests were successful is the relatively expensive position and location optimization performed based on the measurement points of the total model surface. One therefore obtains a good classification result including a 6D position relatively quickly with this cascade.

Thereby the range-image test preferentially prefers including the following steps:
  recording a measurement distance image of the a measurement object in which the distances are in particular color-coded or gray-coded;
  calculating a virtual model distance image of the model object of the hypothesis in position and orientation of the hypothesis, and in particular from the perspective of the recording unit;
  comparing the measurement distance image and model distance image, in particular calculating a distance norm or a correlation; and
  accepting the hypothesis if the comparison shows a match in the scope of a preset tolerance.

Distance images can be interpreted as two-dimensional histograms in which distances are plotted against a surface instead of frequencies and their distance norm can be calculated with a comparatively small effort and/or cost. However, at the same time three dimensions are taken into account by the distance data of the distance images. Through its linear cost structure and through the checks of both the measurement data against the model surface and vice versa, this verification strategy is fast and robust to quickly identify relatively pronouncedly differing hypotheses. Hypotheses differing more finely, in particular in their rotational degrees of freedom, can under some circumstances not be recognized by this strategy. This is, however, reliably achieved with the subsequent methods which thus only have to be applied to hypotheses where their accuracy is also really required. The range-image test thus delivers a quick, already relatively exact pre-filter for the expensive subsequent optimization methods to frequently be able to abort the cascade at an early stage and thus to be able to further optimize the runtime.

For a further acceleration the hypotheses can preferably be tested in parallel in a pipeline in that the next hypothesis is already being generated, while one or more of hypotheses are still being tested and/or in that the cascade of a further hypothesis test is started, while the previous hypothesis is still being tested so that in particular each individual hypothesis test within the cascade can be executed in parallel on a separate component, and/or in that a plurality of hypotheses are generated and tested in parallel in a plurality of threads on a plurality of components. The method in accordance with the invention therefore has the advantage that it can easily be parallelized and can thus fully profit from a corresponding hardware acceleration. These parallelization possibilities are available both within the cascade, and through the provision of a plurality of cascades next to one another.

Advantageously, the measurement object is segmented in advance in that subsets of the measurement object data points, which respectively belong to a segment, are combined and the class, position and orientation are determined for every segment separately in order to thus classify combined measurement objects or a plurality of measurement objects arranged next to one another or above one another. The method in accordance with the invention is thereby not only applicable to a large number of object classes, but also to a large number of measurement objects in the detection area of the recording unit.

The measurement object data points are advantageously recorded three-dimensionally by sampling with a laser scanner or by means of a distance resolving image sensor as a composite recording or through the combination of lines of a relatively moved measurement object, with the distances being determined by a light transit time process, a light cutting process, active triangulation by analysis of a contrast pattern or by stereoscopy. In particular, the line-wise scanning is beneficially suitable for objects moved fast on a conveyor belt in automation, for example through a robot. Alternatively, other three-dimensional imaging methods can be used.

The apparatus in accordance with the invention can be further developed in a similar way and shows similar advantages. Embodiments of the method in accordance with the invention can be implemented in its evaluation unit. Such advantageous features are furthermore exemplary described by way of example, but not exclusively in the subordinate claims dependent on the independent claims.

To create the three-dimensional image data, a laser scanner, or a stereo camera can be provided and a pixel resolving linear or matrix-like recording chip can be used as an image sensor.

The invention will also be explained in more detail in the following with respect to further features and advantages by way of example with reference to embodiments and to the included drawings. The Figures of the drawings show.

Figure 1:
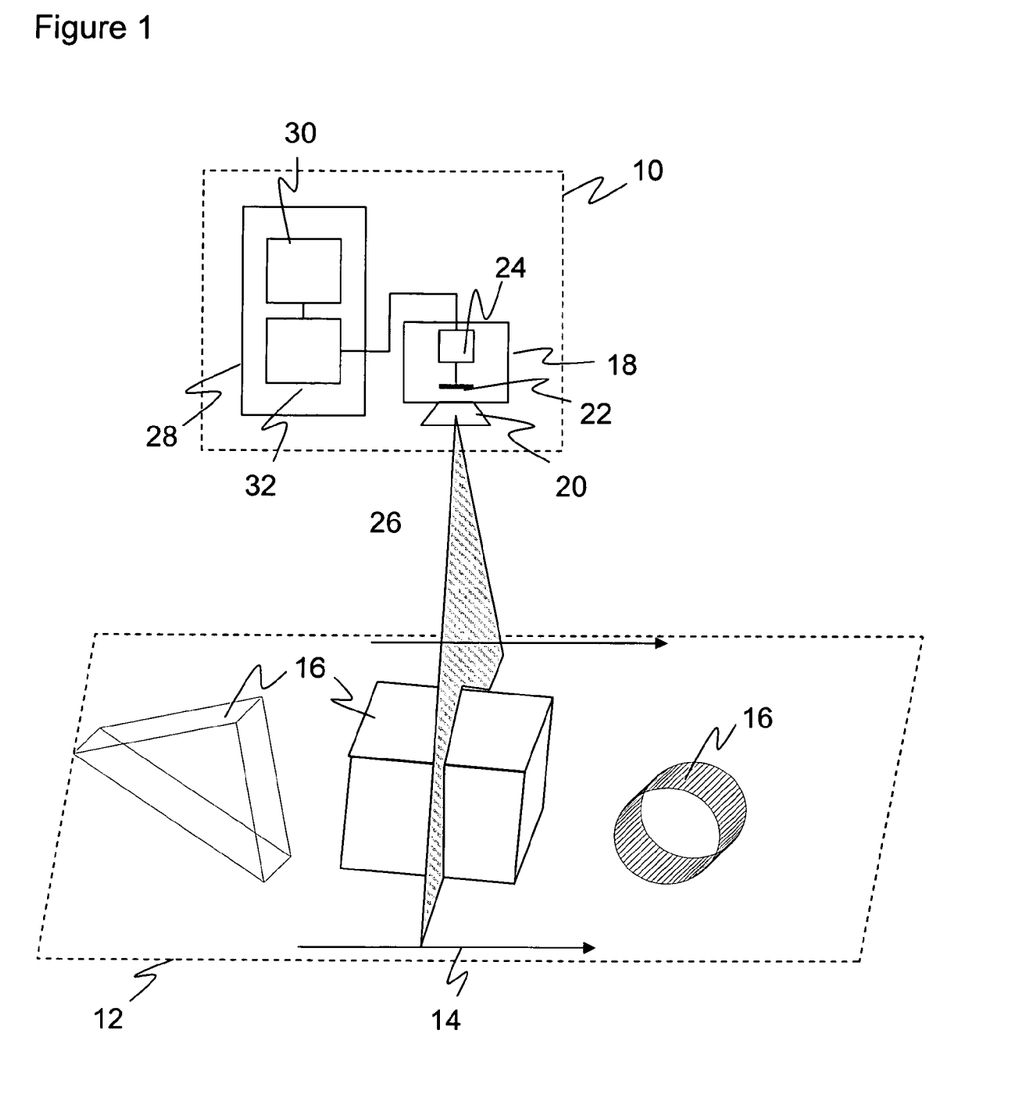
FIG. 1 a three-dimensional representation of a sensor in accordance with the invention above a conveyor belt with a plurality of objects to be classified.

In the schematic three-dimensional representation in accordance with FIG. 1 a sensor 10 in accordance with the invention is installed above a conveyor belt 12, which moves in the direction indicated by arrows 14. Instead of the conveyor belt 12 transport boxes or other conveying means can be used. A plurality of objects 16 are provided on the conveyor belt 12 which in the representation are indicated very schematically as cylinders, cubes and prisms. In practice the objects 16 are, for example, different types of screws, body parts or other components, which should automatically be gripped or installed by a robot.

A laser scanner scans the objects 16 line wise and records remission data of the reflected laser beam as well as distance data via their light transit time.

In an alternative embodiment, shown in FIG. 1, a camera is used as a recording element instead of a laser scanner 18 and records the objects 16 moved past and generates image data from them. The camera includes an objective 20 and an image sensor 22, with this image sensor 22 being able, for example, to be a recording chip based on CMOS technology or CCD technology.

To be able to generate three dimensional data, a camera control 24 is provided. Different methods for the determination of distances are conceivable, that is the third depth dimension, and all these three dimensional methods are included in this invention. For example, a lighting for the transmission of light pulses or of modulated light can be provided and the camera control 24 can calculate distances via the speed of light from the light runtime, or the phase shift respectively. This is also a measurement principle in which, according to with the initially presented embodiment of the recording unit, the laser scanner can determine distances via the runtime of the transmitted pulse or via the phase shift of the scanning beam. Specifically here, light runtime elements are also known which are integrated into the image sensor 20 and which are based on photon mix detection (PMD). Alternative three-dimensional imaging methods are light cutting processes, active triangulation which analyses a pattern of a contrast pattern illumination in the object area or evaluations based on a disparity estimation of like image elements of a stereoscopic double camera.

Instead of a matrix like image sensor 22, a linear recording chip can be provided which records and combines the depth image line wise in a reading line 26 in each case during the relative motion of the object 16 with respect to the sensor 10 by the conveyor belt 12.

In a calculation unit 28 a memory 30 is located with a model library and an evaluation unit 32. The calculation unit 28 can be integrated into the sensor 10 or be on a external computer which can be connected to the recording unit 18 by any desired wireless or wired interface. In the calculation unit 28 the method in accordance with the invention for object classification and for the determination of the 6D position of an object 16 is implemented. This method should be described in more detail in the following with reference to the FIGS. 2 to 7.

Figure 2:
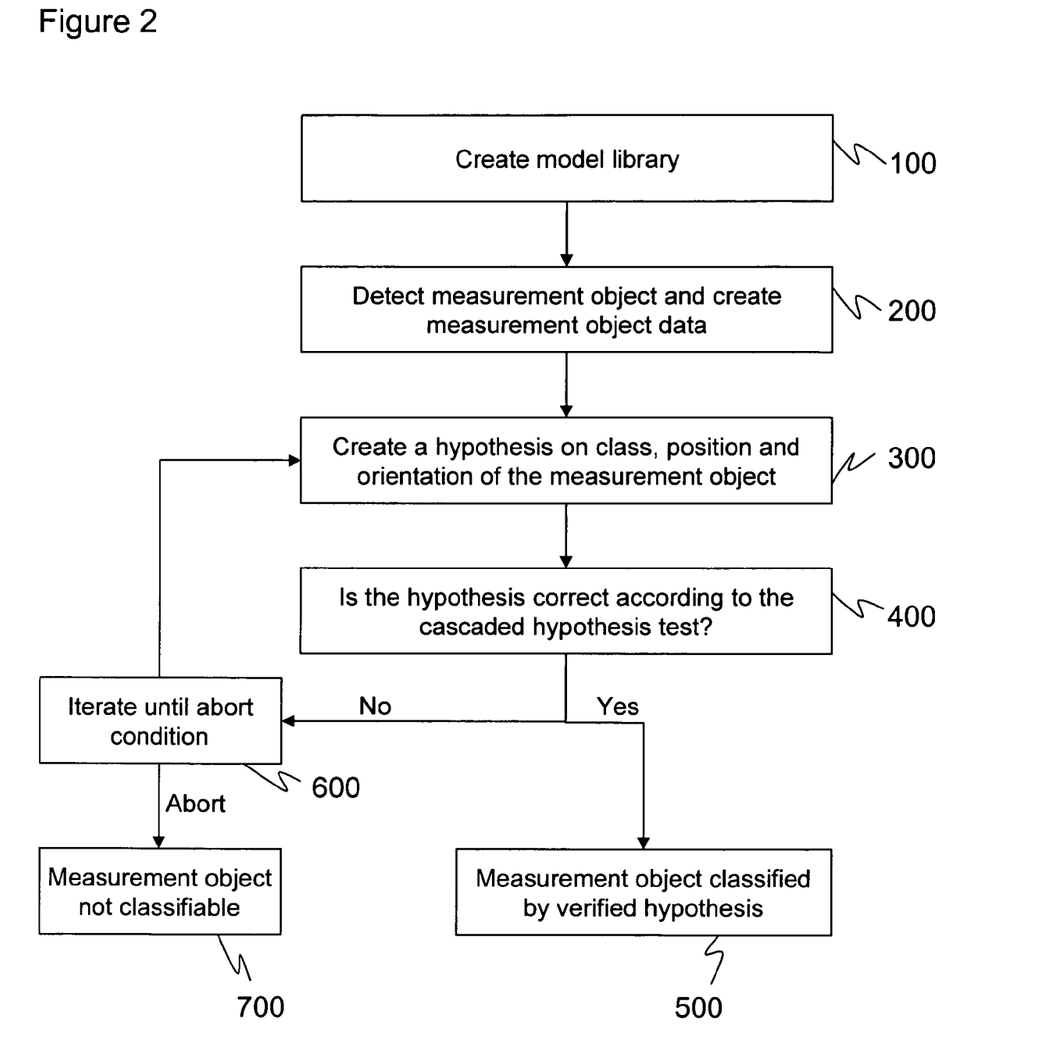
FIG. 2 a flowchart as a total overview of an embodiment of the method in accordance with the invention.

FIG. 2 initially shows an overview of the classification method in accordance with the invention as a flowchart. In a preparation step 100 a model library for the classification of objects 16 is initially generated which is stored in the memory 30 (see FIG. 3). During the operation in a step 200 a measurement object 16 is in each case detected by the recording unit 18, the created image data are pre-processed and are provided to the further classification process in the form of a polygon mesh and of point correspondences with points of the model objects (see FIG. 4).

The actual classification is then performed in an iterative process in which initially in a step 300 a respective hypothesis on the class, position and/or orientation of a measurement object 16 is generated sequentially (see FIG. 5) and subsequently in a step 400 this hypothesis is checked in a cascaded hypothesis test method (see FIG. 6). This iteration of the steps 300 and 400 is continued for so long until in a step 500 a hypothesis can be verified in the scope of the required accuracy and this verified hypothesis thus produces the object class and/or the 6D position searched for or until, in a step 600, an abort condition is reached which leads to the output in a step 700 that the measurement object 16 could not be classified. Any abort condition can be chosen in this respect which ensures that the method is terminated. Preferentially, one presets a maximum number of hypotheses to be tested or a maximum runtime which then corresponds to the reaction time of the sensor 10.

Figure 3:
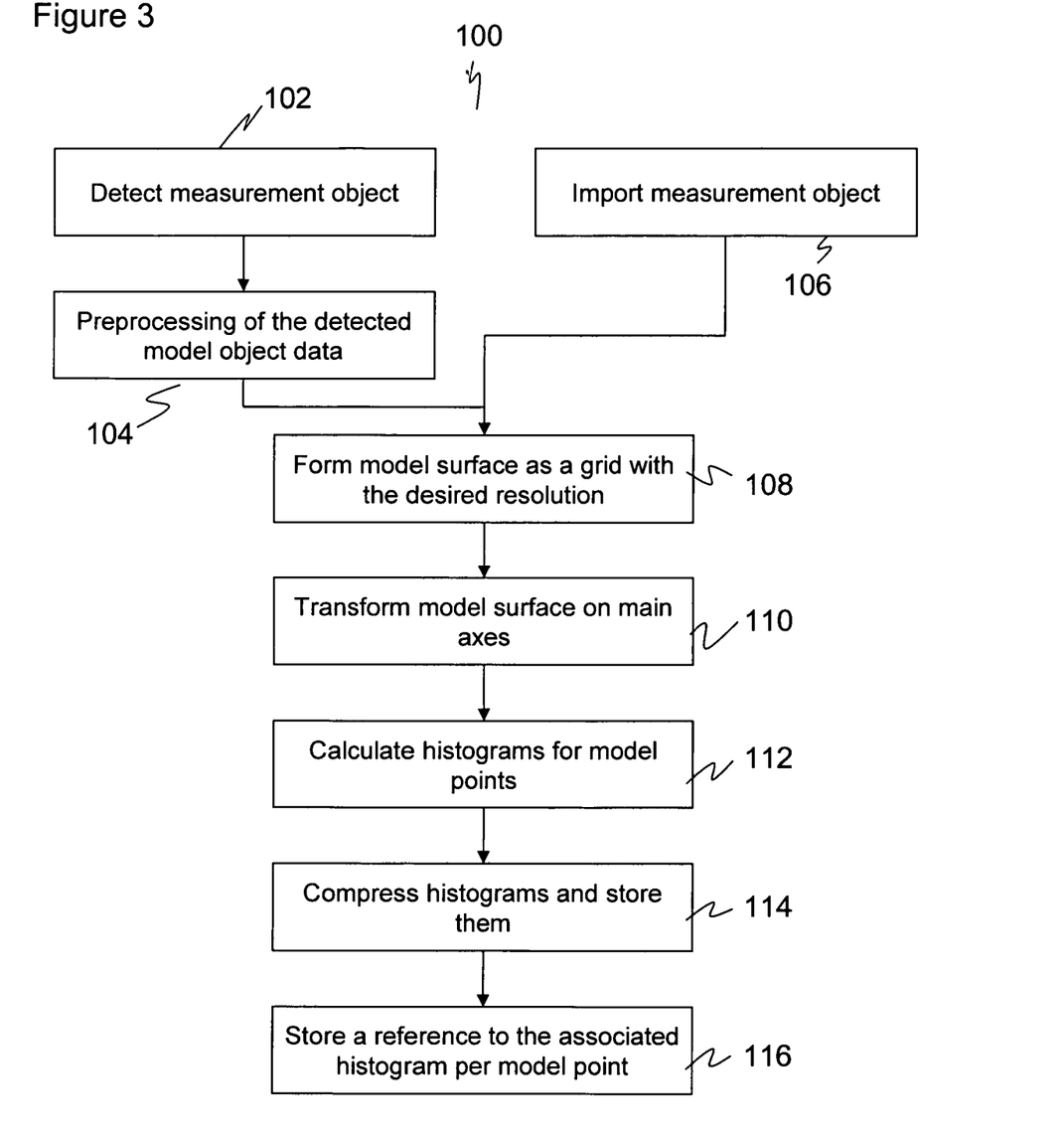
FIG. 3 a flowchart for the explanation of the construction of the model library.

FIG. 3 shows a flowchart which explains the generation of the model library in the memory 30. In a step 102 a model object is detected to record its surface. The recording unit 18 preferably generates the corresponding surface data; this can, however, also be done in another device. The model data are preprocessed in a step 104, for instance, smoothed or filtered, as this will still be described for the measurement objects of FIG. 4. As an alternative to having the model object detected by and thus taught to the recording unit, in a step 106 model data can also be imported, for example from a CAD file.

Following the teaching or the importing, data of the model surface are present. A grid or a polygon mesh of the required resolution is generated from these model data in a step 108. For example, an order of magnitude of 1000 points of the model surface can remain. To remain invariant from the rather random position of the object 16 while teaching or while importing, the data are transformed and thus normalized via the PCA (principle component analysis) on their main axis.

Following this, in a step 112, a suitable object descriptor must be chosen. Histogram-based approaches have been shown to be particularly suitable for this as they best satisfy the requirements on the runtime, the memory requirements and the accuracy. In the histogram, the distribution of a property of the model surface point related to a fixed point is approximated in each case. Such a histogram of the model surface points bound to a point can later be compared to a point of the measurement object surface to determine whether a similarity or a correspondence is present in this point. Since the choice of the object descriptor is decisive, it is generally not sufficient to store an arbitrary property describing the model surface in an arbitrary histogram.

Instead of this, such histograms are preferably used which are rotationally invariant at least in some way. For this purpose the model surface points are not detected in Cartesian coordinates, but rather, in cylindrical coordinates or spherical coordinates. The histogram is then formed via one of the angular coordinates. Spin images, on the one hand, and 3D-shape contexts, on the other hand, fall into this class. With a spin image a two-dimensional histogram is spanned around the point of interest in the R and Z directions of cylinder coordinates, said histogram counting the frequency of further surface points in the φ direction. In other words, the φ coordinate is replaced by the frequency so that a spin image is independent of the rotation about the Z axis. In this respect, the Z axis corresponds to the normal on the surface of the model object through the observed point. Following a very similar concept, spherical coordinates are used for 3D shape contexts, and instead of circles such as with the spin images, frequencies of further surface points are evaluated in spherical shells, angular segments ("cake slices") or a combination of both ("cob webs").

Another histogram based approach is to form the histogram via distances and remissions. This histogram or remission image thus approximates to a distribution in which distance how many points with similar remission properties are found ("brightness").

Finally, it is conceivable to combine these approaches, i.e. to evaluate a plurality of histogram types to a point, for instance spin images and remission-based histograms.

Depending on the resolution, the histograms can, in a step 114, be compressed in a compressing process, for example JPG, as long as the additional runtime for the decompression can be accepted in the later analysis. The histograms are stored in compressed or non-compressed form in the memory 30.

With many model objects, particularly such with symmetries, a number of histograms are identical to one another or very similar. It is then worthwhile, in a step 116 to store these histograms in each case only once in the memory 30 and to have points in which these histograms are determined refer to the histogram stored in the manner by referencing or hashing table to reduce the memory demand.

For common industrial classification tasks only a small number of objects 16 have to be differentiated. These objects can be taught or imported sequentially or also at different times in each case by the method which has just been described, but which per se only limits the number of objects 16 in the media library by the size of the memory 30.

Figure 4:
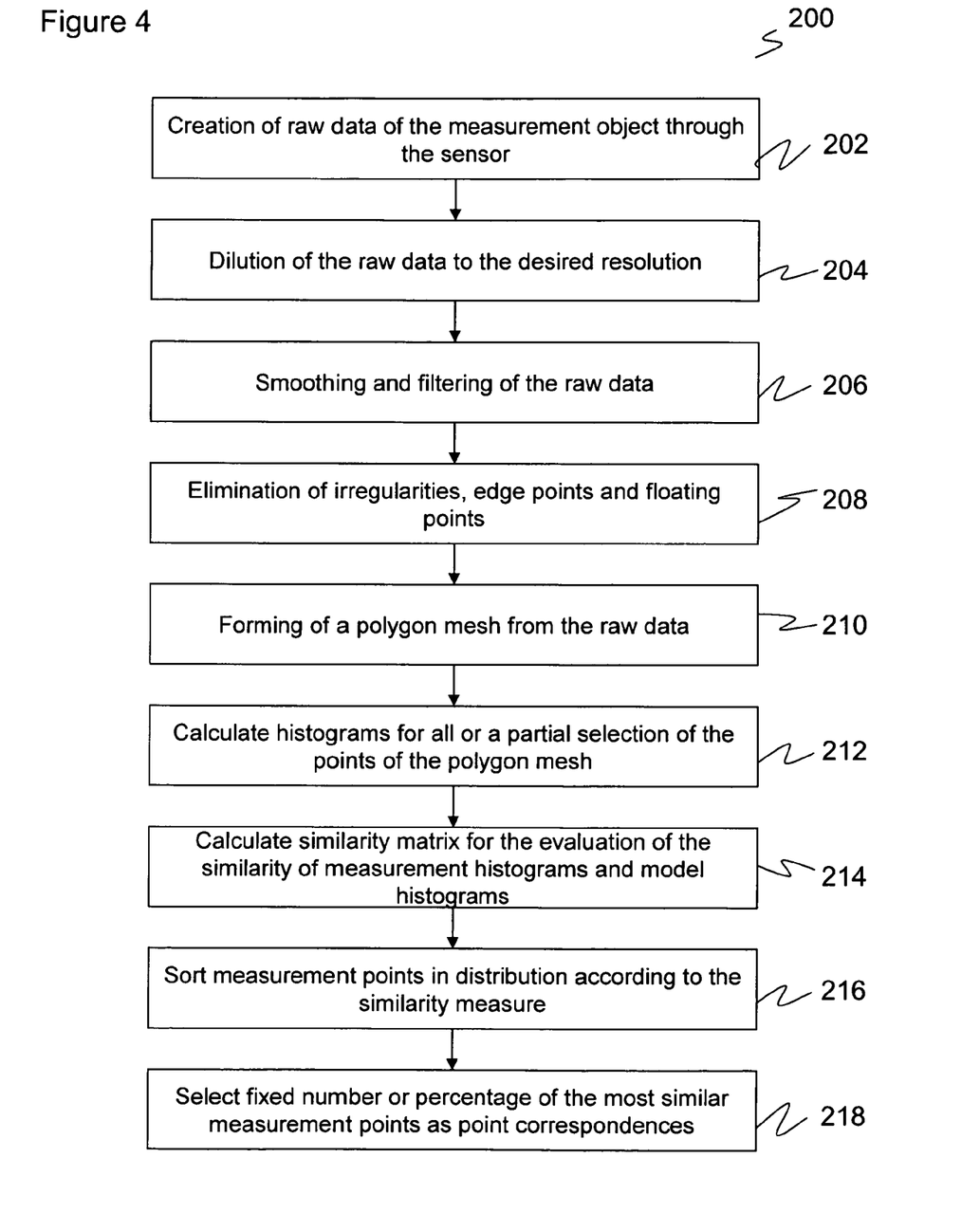
FIG. 4 a flowchart for the explanation of the processing of raw data of the recording unit to a polygon mesh of the measurement object surface as well as to point correspondences.

The flowchart of FIG. 4 describes how the measurement object is detected by the recording unit 18 in a step 200, how the resulting raw data are preprocessed and from point correspondences of model objects in the model library of the memory 30 are determined.

Initially, the recording unit 18 detects the measurement object 16 in a step 202 and creates three-dimensional raw data using a method described in FIG. 1. These raw data are subsequently transformed into a resolution desired by the for the object classification resolution preset by the recording unit 18 in a step 204.

Subsequently, in a step 206, the raw data are smoothed and filtered. This can, for example, occur by folding with a linear or a Gaussian filter core. In a step 208, irregularities, edge points and floating points are eliminated. No normal can be defined in irregularities and at edges such as is required for spin images for instance and floating points do not allow any definition of a sensible grid net (in the following also described as a polygon mesh).

The raw data filtered in this way is then, in a step 210, connected to a polygon mesh whose polygons represent the surface of the object 16. Triangular and quadratic meshes are preferred because of the simplicity of the polygons.

In a step 212, histograms, which correspond to those of the model library, i.e. for example spin images are calculated for all grid points of the polygon mesh. Only a particularly randomly chosen subset can also be used instead of all grid points, since the calculation of these histograms is a comparatively expensive operation. This subset must represent the surface of the measurement object 16 well so that without knowledge of the model only a random selection of a sufficiently large number of points is sufficient. Usually, 50 to 200 points are sufficient. Basically, these histograms of the measurement object 16 can be compressed in a similar way to those of the model library or, stored as a reference in steps 114 and 116. However, due to the lower number of points the memory gain is significantly reduced and one sacrifices in particular, runtime important for this memory gain.

In a step 214, it is now determined with which model histogram the then generated measurement histograms match. All point correspondences where this is the case are good candidates for a indication of a match of the measurement object 16 and a model object, which then also sets the class of the measurement object 16. For this purpose, a similarity matrix between the points of the measurement object surface of the measurement object 16 and points of the model library is generated. This matrix can be complete, i.e. every point of the measurement object 16 is compared to every point of all model objects, or a selection takes place on the side of the measurement object 16 or of the model objects which is preferably random again without the model knowledge.

For the assessment of the similarity, arbitrary mathematical measures can be selected, with which the similarity of the two value tables can be assessed as which the histograms can be understood. Examples which were successful include the $L_p$ norm, in particular $L_1$ or $L_2$, or a correlation coefficient.

Due to their degree of similarity possible point correspondences can be sorted into a similarity distribution in a step 216. If, in a step 218, one only keeps the right part of this distribution, i.e. the most similar histograms, one thereby finds the desired point correspondences. Here, a fixed number or a fixed percentage of those measurement points which are based on the similarity distribution can be selected, for example, 100 point correspondences or the best percentage.

With the polygon mesh of the measurement object surface, with the model library and with the point correspondences, all data are available to iteratively form and check hypotheses on the class of the measurement object 16 and its 6D position. In accordance with the invention a RANSAC algorithm (RANdom SAmple Consensus) is provided for this purpose. A random subset (sample) of the measurement data is selected in each case, which to reduce the effort and/or cost preferably contains just as many elements as are required for a verification or a falsification of the hypothesis. This is continued for so long until a hypothesis is verified or an abort condition is reached.

Figure 5:
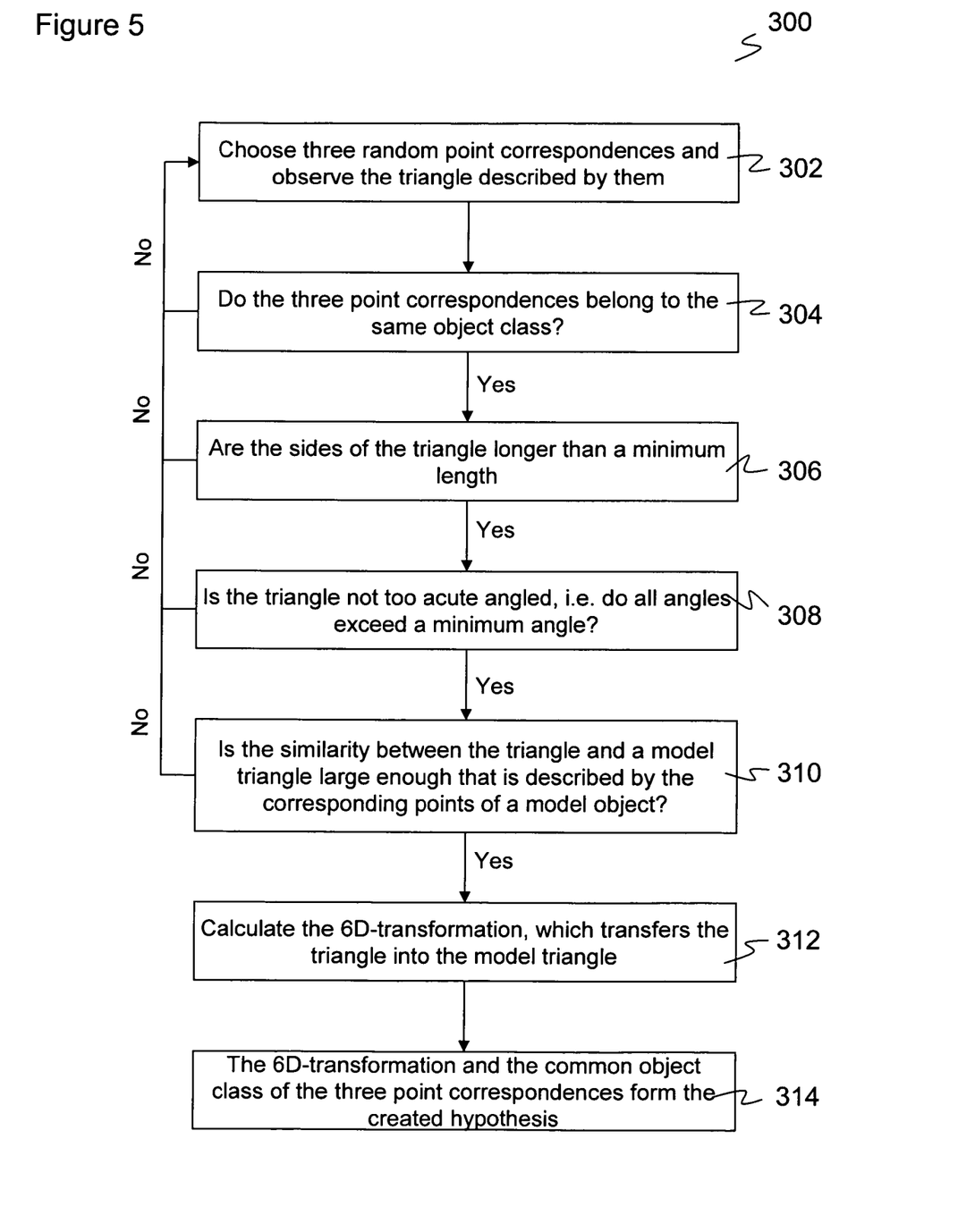
FIG. 5 a flowchart for the explanation of the generation of hypotheses.

FIG. 5 explains the step 300 for the generation of hypotheses from the point correspondences. Initially, in a step 302, in accordance with the RANSAC paradigm a smallest possible random selection of a few point correspondences is carried out. To determine a 6D transformation, at least three point correspondences should be drawn so that the triangle formed by them in the measurement object 16 allows an at least generally unambiguous transformation into the 6D position in the model object. For spin images, two points would be sufficient since the rest of the information is present in the direction of the normal; however, it has been shown that the direction of the normal in practice cannot be determined robustly enough and thus three point correspondences are to be preferred with respect to only two point correspondences. However, it is still possible and included in the invention to draw less than three point correspondences, just as it is naturally possible to draw more than three point correspondences and to therefore over determine the hypothesis.

The three drawn point correspondences and the triangle formed by them are subsequently subjected to a series of plausibility tests, failure of which leads to a respective new drawing. In a step 304 it is initially established whether all three drawn point correspondences belong to the same model object class. If this is not the case, the good point correspondence determined in step 218 leading to the selection is based on a respective random local match between the model and the measurement object 16. The thus ensured common model object class is simultaneously the classification of the measurement object 16 in accordance with the generated hypothesis.

In a step 306, it is established whether the sides of the triangle are larger than a minimum length. Otherwise the 6D transformation would be too inaccurate and because of the too small spacing, too great a significance would be given to a local region.

For similar considerations, it is established in a step 308 whether the triangle is not too acutely angled, i.e. that all three angles exceed at least a minimum angle.

Finally, in a step 310, the triangle is compared to a model triangle which is spanned from the corresponding points to the measurement points on the model surface. These two triangles must exhibit a high similarity.

Now, in a step 312, the 6D transformation can be calculated which transfers the triangle into the model triangle. This 6D transformation and the common object class of the three point correspondences checked in step 304 then form a hypothesis which is output in step 314.

Figure 6:
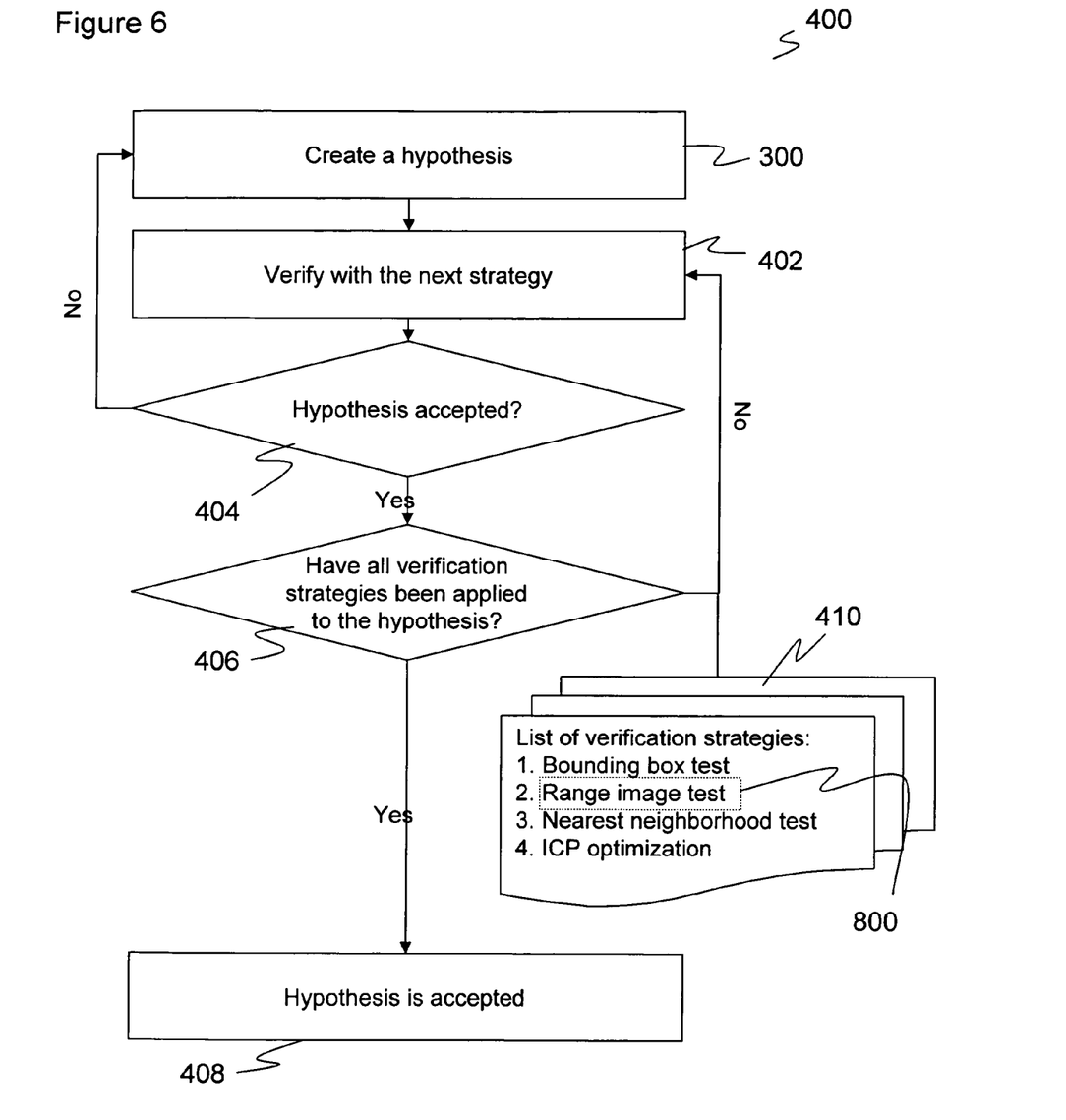
FIG. 6 a flowchart for the explanation of the cascadized verification of hypotheses.

FIG. 6 explains in a flowchart how the hypothesis just generated in step 300 is verified in cascaded form. A cascaded hypothesis test is used in each case to combine the advantages of fast, fairly inaccurate hypothesis tests and of slower, but more precise hypothesis tests with one another. In this respect, it is not a single verification strategy which is applied, but a cascade of a plurality of verification strategies. The individual verification strategies are preferably sorted by their average computing time in this cascade, with a start being made with the fastest. Pronounced discrepancies in the hypothesis can thereby be quickly recognized through the first verification strategies. Since the error rate of the verification strategy decreases with an increase in calculation time smaller, but not yet tolerable discrepancies in the hypothesis are reliably recognized and discarded through the latter verification strategies.

In a step 402 the hypothesis is therefore tested in a first run with the first strategy and in further runs in each case with the next strategy. If, in a step 404, the hypothesis is accepted, then in a further step 406 a test is also made whether all the verification strategies have already been applied to this hypothesis. Only then is the hypothesis accepted in a step 408. Otherwise the process skips back to a step 300 in which a new hypothesis is generated. To prevent a hypothesis from being tested a plurality of times, already tested hypotheses can be correspondingly stored and tested in advance. In principle it is true for the tolerance levels with which a hypothesis test still accepts a hypothesis that more different objects are classifiable if the tolerances are higher, but at the same time a higher failure rate is present, and vice versa.

Four verification strategies are shown in the sequence in which they are worked through in accordance with a preferred embodiment of the invention in a list 410. For the understanding of the invention it is useful to know that the point correspondences for the verification of the hypotheses are frequently no longer needed. They can, however, naturally also serve, besides for the generation of hypotheses, for their verification in one or all verification strategies.

Each verification of a hypothesis in the illustrated embodiment is thus started with the bounding-box test in which the model in accordance with the hypothetical object class is surrounded by a simple envelope body, for instance a sphere, a parallelepiped or a cylinder. This envelope body is preferentially stored in the memory 30 with the model library to save runtime. The bounding box test merely tests whether a few or, in a borderline case, also all measurement points of the measurement object 16 lie within this envelope body. The test is thus not particularly accurate, but can quickly exclude the false hypotheses.

Figure 7:
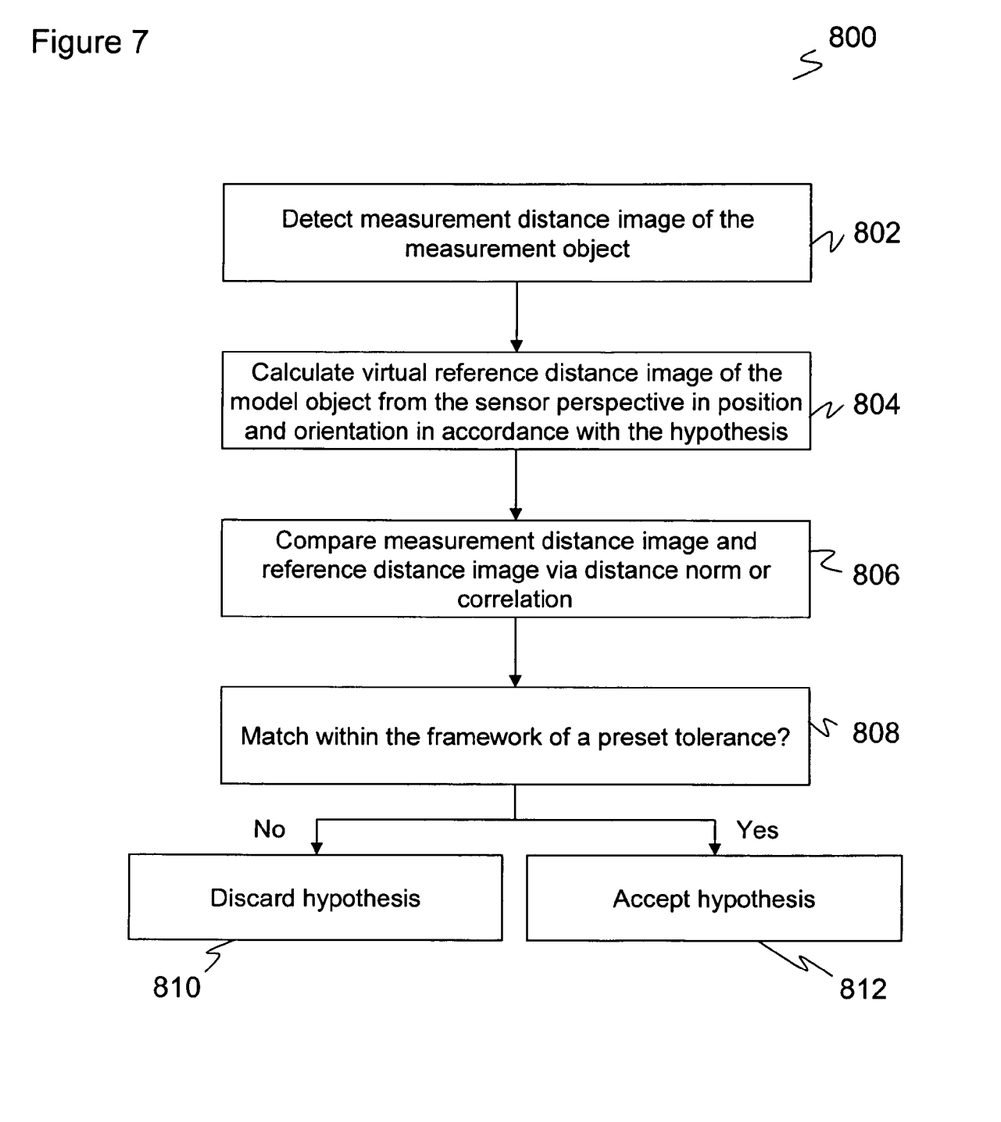
FIG. 7 a flowchart of a range-image method which in an embodiment of the invention is used as one of the hypothesis test within the cascade.

A range-image method 800 is used as a second verification, which is illustrated in detail in FIG. 7. In this respect, a real distance image of the measurement object 16 is compared to a virtual distance image of the model object in accordance with the hypothetical class and the 6D position.

The range image method runs as follows in detail. In a step 802, a two dimensional distance image is generated from the data, already made available in the step 202 by the recording unit 18, with the distances being coded by a grey shade or by a color in said two-dimensional distance image. This distance image can, optionally, be filtered, smoothed, made richer in contrast with known image processing methods or be post-processed in another way.

In a step 804, a virtual reference distance image of the model object corresponding to the measured distance image is calculated from the perspective of the recording unit 18 on which the model object is based in accordance with the class and in a 6D position of the hypothesis. In order not to have to calculate in a complex and/or expensive manner which polygon surfaces are hidden by others, the distance image can be calculated from "back to front", i.e. it can be generated from far away up to more closely disposed-model object points so that automatically only such surfaces are illustrated in the distance image which can be seen by the recording unit 18.

In a step 806, the measurement distance image is compared to the reference distance image. For this purpose, in principle, the same similarity measures can be used as in the comparison between the measurement histogram and the model histogram since, mathematically, the same problem has to be solved. Accordingly, for example, a distance norm for a correlation coefficient can be calculated.

Depending on the match between the measurement distance image and the reference distance image, a decision is taken in a step 808 whether the hypothesis is discarded in a step 810 or is accepted in a step 812.

The range image method can also be executed based on a plurality of distance images which are also recorded at different conveying position of the measurement object 16. Instead of distance values, remission values can be used (the method would then expediently be called a remission image method).

Returning to FIG. 6, if the two distance images are accordingly similar enough after the second verification strategy, then in accordance with the list 410 a nearest-neighbor test is carried out as a third method in which the grid mesh of the measurement object 16 is compared to the grid mesh of the hypothetical model object.

For acceleration, a partial selection of the grid mesh of the measurement object 16 can be used, for example every tenth point, or in each case only a random representative from a local environment of ten points. For this partial selection or for the complete grid mesh in each case a nearest-neighbor is searched for on the grid mesh of the model object and the distance is calculated. The sum of all these distances provides a measure for how good the measurement object 16 and the model object coincide. Other mathematical measures are also conceivable which evaluate the similarity of the scatter plots in accordance with the partial selection with the scatter plots of the model object.

The fourth and last verification strategy is at the same time also a further optimization of the hypothetical 6D position. The grid mesh of the measurement object 16 is brought into best possible coincidence with the grid mesh of the model object in a least mean square method (ICP algorithm, iterative closest point). Here, too, instead of the $L_2$ norm in accordance with the least mean square, a different measure can be optimized, i.e. any other distance norm, a correlation norm or further measures.

A particular advantage of an ICP verification at the end of the verification cascade is not only given by the fact that this by far the most complex method is only executed on really good hypotheses. A large problem namely is the local convergence instead of the global convergence where the algorithm gets stuck in a pseudo solution which is only ideal in a few partial aspects. The starting conditions are already very good at the end of the cascade due to the preferred hypothesis so that both a significantly faster convergence and a substantially rarer classification error due to local convergence are to be expected.

The result of the ICP algorithm is accepted as soon as a degree of matching at the points of the measurement object 16 to a counterpart in the model object is large enough and a distance measure of these points measured by the degree of matching is small enough. In other words a big enough part of the measurement object 16 has to overlap closely enough with the model object.

One can interpret the nearest neighbor test as the 0th iteration of the ICP algorithm which therefore only evaluates the similarity once, but does not optimize it and one can correspondingly implement it very simply by a corresponding activation of the ICP method.

The calculation unit 28 can be adapted on the hardware level and/or the software level for a pipeline structure in which the hypothesis creation of the step 300 can take place in an overlapping manner in parallel with each of the subsequent test methods 410. Alternatively or simultaneously, a plurality of processor cores and/or threads can be provided with which a plurality of respective hypotheses are simultaneously generated and verified in a parallelized manner. As long as one also provides the memory 30 with the model library a corresponding plurality of times and thus prevents multiple access to a common resource, the method in accordance with the invention scales almost linearly with the number of processor cores.

It is conceivable to segment the object 16 before the classification through the described method. A superimposition of a plurality of objects and objects compiled from different objects can thereby also be classified, whereby the number of the possible applications and/or the runs at objects 16 is increased.

Although the method has been described with reference to point correspondences, it can also be executed in an analog way with other correspondences, for instance starting from any desired surface sections or polygons of the same, in principle also starting from structures which are inside or outside the object and not on its surface. These correspondences only have to have a manageable measure for a local matching.

The invention claimed is:

1. A method for, determining at least one of an object classification, an object position, and an object orientation in space, comprising the steps of:
    generating measurement object data points of a measurement object surface using a distance resolving receiver unit;
    using the measurement object data points in conjunction with model object data determined in advance to propose and verify a hypothesis on at least one of a class, a position, and an orientation of a measurement object, wherein a plurality of different hypothesis tests are cascaded in such a way, that only on verification of a hypothesis through a hypothesis test is a subsequent hypothesis test carried out within this cascade, the hypothesis tests continuing until either:

a hypothesis is falsified by failure of a hypothesis test, or a hypothesis is verified as a whole through a complete run through a cascade without falsification, wherein the hypotheses tests include a bounding box test in which a selection of measurement object data points is tested to see whether they lie within an envelope body of the measurement object, a range image test, a position and orientation optimization test in which measurement object data points are brought into an optimal match with a surface grid of a measurement object, and a nearest neighbour test where the $0^{th}$ iteration of the position optimization is based on a selection of the measurement object data points.

2. The method in accordance with claim 1, wherein the cascade is processed starting from a hypothesis test with a shortest run time up to a hypothesis test with a longest run time.

3. A method in accordance with claim 1, wherein the model object data include model histograms which, respectively starting from a point of the model surface, describe at least one of the position distribution and a property of neighbouring model surface points.

4. A method in accordance with claim 3, wherein the model object data are calculated from a CAD file and archived in a model library, wherein selected model histograms are only stored once in the model library, wherein only a reference to a corresponding model histogram is stored in memory, and wherein the model histograms are compressed for data reduction.

5. A method in accordance with claim 3, wherein correspondences are determined between model surface points and measurement surface points by evaluating a similarity between model histograms and measurement histograms using at least one of a distance norm and a correlation, and wherein a small proportion of correspondences with the best similarity evaluation are used for the hypothesis tests.

6. A method in accordance with claim 1, further comprising the steps of:

running the cascade of the hypotheses tests a plurality of times until at least one of a hypothesis is verified to the required accuracy, a highest run time is exceeded or an upper limit of a number of hypothesis to be tested is exceeded;

proposing, for each run through the cascade, a hypothesis for the object class, a position and an orientation of the measurement object is proposed;

randomly determining at least two subsets of point correspondences under the requirement that all point correspondences of each subset belong to the same object class; and determining a position and orientation of the measurement object from at least one of the position and the orientation belonging the point correspondences of the at least two subsets.

7. A method in accordance with claim 1, wherein the range image test includes the following steps:

recording of a measurement distance image of the measurement object, in which the distances are in particular colour coded or grey coded;

calculation of a virtual model distance image of the model object of the hypothesis in position and orientation of the hypothesis and in particular from the perspective of the recording unit;

comparison of measurement distance images and model distance images, in particular calculation of a distance norm or a correlation and acceptance of the hypothesis, if the comparison shows a match in the scope of a preset tolerance.

8. A method in accordance with claim 1, further comprising the steps of:

testing hypotheses in parallel in a pipeline; and generating a next hypothesis while either:

at least one hypothesis is still being tested or a cascade of a further hypothesis test is started while a previous hypothesis is still being tested.

9. A method in accordance with claim 1, further comprising the steps of:

segmenting the measurement object in advance;

combining subsets of the measurement object data points which respectively belong to a segments; and determining position and orientation for every segment of the class.

10. A method in accordance with claim 1, wherein the measurement object data points are recorded three-dimensionally; and, wherein the distances are determined by at least one of a light transit time process, a light cutting process, active triangulation by the evaluation of a contrast pattern, and stereoscopy.

11. An apparatus for recognizing at least one of an object classification, an object position, and an object orientation in space, comprising:

a distance resolving optoelectronic receiver unit configured to generate measurement object data points of a measurement object surface;

a model memory configured to store model object data; and an evaluation unit configured to generate from the measurement object data points hypotheses for at least one of the class, the position and the orientation of a measurement object using model object data and configured to verify these generated hypotheses, wherein the evaluation unit is further configured to execute a plurality of different hypothesis tests cascaded in such a way, that only upon verification of a hypothesis by a hypothesis test is a subsequent hypothesis test carried out within this cascade, the hypothesis tests continuing until either:

a hypothesis is falsified by the failure of a hypothesis test, or a hypothesis is verified as a whole through a complete run through the cascade without falsification, wherein the hypotheses tests include a bounding box test in which a selection of measurement object data points is tested to see whether they lie within an envelope body of the measurement object, a range image test, a position and orientation optimization test in which measurement object data points are brought into an optimal match with a surface grid of a measurement object, and a nearest neighbour test where the $0^{th}$ iteration of the position optimization is based on a selection of the measurement object data points.

12. The apparatus in accordance with claim 11,
wherein the receiver unit is selected from the group consisting of a laser scanner, a stereo camera, and a lighting apparatus configured to emit light pulses or modulated light; and
wherein the evaluation unit is configured to determine distances from at least one of a light run time and a phase shift.

13. The apparatus in accordance with claim 11, wherein the receiver unit includes at least one of a pixel resolving linear and a matrix-like image sensor; and
wherein the evaluation unit is configured to determine measurement data points in a three-dimensional detection area.

14. The method in accordance with claim 1, wherein corresponding measurement histograms are generated from at least one part of the measurement object data points.

15. The method in accordance with claim 4, wherein the reference to the corresponding model histogram is stored in memory using at least one of referencing and hashing to the model surface points.

16. The method in accordance with claim 4,
wherein the model object data are taught from a CAD file and archived in a model library,
wherein selected model histograms are only stored once in the model library,
wherein only a reference to a corresponding model histogram is stored in memory, and
wherein the model histograms are compressed for data reduction.

17. The method in accordance with claim 5, wherein a proportion of at most 1% of a distribution of the similarity evaluation of all possible comparisons between model histograms and measurement histograms is used for hypothesis tests.

18. The method in accordance with claim 8, wherein each individual hypothesis test within a cascade is executed in parallel.

19. The method in accordance with claim 8, at least one of a plurality of threads and a plurality of hypotheses are generated and tested in parallel on a plurality of components.

20. The method in accordance with claim 10, wherein the measurement object data points are recorded three-dimensionally using at least one technique selected from the group consisting of sampling with a laser scanner, using a distance resolving image sensor as a composite recording, and using a combination of lines of a relatively moved measurement object.

* * * * *